(12) United States Patent
Kaneko et al.

(10) Patent No.: US 6,693,692 B1
(45) Date of Patent: *Feb. 17, 2004

(54) LIQUID CRYSTAL DISPLAY

(75) Inventors: Yasushi Kaneko, Sayama (JP); Makoto Arai, Tokorozawa (JP)

(73) Assignee: Citizen Watch Co., Ltd., Nishitokyo (JP)

( * ) Notice: Subject to any disclaimer, the term of this patent is extended or adjusted under 35 U.S.C. 154(b) by 342 days.

This patent is subject to a terminal disclaimer.

(21) Appl. No.: 09/762,329

(22) PCT Filed: Jun. 7, 2000

(86) PCT No.: PCT/JP00/03696
§ 371 (c)(1),
(2), (4) Date: Feb. 6, 2001

(87) PCT Pub. No.: WO00/75718
PCT Pub. Date: Dec. 14, 2000

(30) Foreign Application Priority Data

Jun. 7, 1999 (JP) ............................................ 11-159227

(51) Int. Cl.[7] ............................................ G02F 1/1335
(52) U.S. Cl. ........................................ 349/117; 349/114
(58) Field of Search ................................. 349/117, 118, 349/113, 114

(56) References Cited

U.S. PATENT DOCUMENTS

2002/0145689 A1 * 10/2002 Kaneko et al. ............. 349/114

FOREIGN PATENT DOCUMENTS

| JP | 4-97121 | 3/1992 |
| JP | 8-76111 | 3/1996 |
| JP | 8-292413 | 11/1996 |
| JP | 9-33882 | 2/1997 |
| JP | 9-33907 | 2/1997 |
| JP | 10-31211 | 2/1998 |
| JP | 10-123505 | 5/1998 |
| JP | 10-282488 | 10/1998 |
| JP | 11-249165 | 9/1999 |
| JP | 2000-66191 | 3/2000 |

* cited by examiner

Primary Examiner—Dung Nguyen
(74) Attorney, Agent, or Firm—Westerman, Hattori, Daniels & Adrian, LLP

(57) ABSTRACT

A reflective liquid crystal display device, employing a single polarizing film comprises a liquid crystal element (20) comprised of a twist aligned nematic liquid crystal layer (6) sandwiched between a first substrate (1) thereof, provided with a reflector (7) and first electrodes (3) and a second substrate (2) thereof, provided with second electrodes (4), a twisted retardation film (12) deposited on the outer side (the visible side) of the second substrate (2) of the liquid crystal element (20), further a retardation film (13), and a polarizing film (11) which are sequentially deposited in that order on the outer side of the retardation film (12). As a result, reflective display bright and in high contrast can be effected.

21 Claims, 9 Drawing Sheets

LIQUID CRYSTAL DISPLAY

TECHNICAL FIELD

This invention relates to liquid crystal display devices. In particular, the invention is concerned with a reflective liquid crystal display device and a transflective liquid crystal display device, employing a single polarizing film method, for effecting bright display in black and white or in color by the agency of a reflector provided in a liquid crystal element of the device, and a sheet of polarizing film deposited on the outer side of the liquid crystal element.

BACKGROUND TECHNOLOGY

For a reflective liquid crystal display device, there has been mainly adopted a construction wherein a TN (twisted nematic) liquid crystal element or an STN (supertwisted nematic) liquid crystal element is disposed between a pair of polarizing films, and a reflector is installed on the outer side of one of the polarizing films.

With such a reflective liquid crystal display device, however, external light passes through each of two sheets of the polarizing films twice from the time when the external light enters from the visible side of the device until it goes out towards the visible side after reflected by the reflector, so that reduction in light quantity is increased, and thereby a dark display is effected. Moreover, since the reflector is installed on the outer side of a glass substrate of the liquid crystal element, there has arisen a problem that shadows appear on display.

To cope with the problem, a single polarizing film type liquid crystal display device, capable of effecting display with just one sheet of polarizing film, has since been proposed. With such a liquid crystal display device having only one sheet of polarizing film, reduction in light quantity can be decreased in comparison with the case of a conventional reflective liquid crystal display device employing two sheets of polarizing films, thereby improving brightness of images in display.

Further, with the single polarizing film type liquid crystal display device, it is possible to solve the problem of the shadows appearing on display by forming a reflector inside a liquid crystal element.

Such a single polarizing film type liquid crystal display device is comprised of one sheet of polarizing film, one sheet of retardation film, and a liquid crystal element incorporating a reflector, as disclosed in, for example, Japanese Patent Laid-open JP, 04-97121, A.

With such a conventional single polarizing film type liquid crystal display device employing one sheet of retardation film as described above, however, in the case of effecting black display, it has been possible to attain a low reflectance (a ratio of an outgoing light quantity to an incident light quantity as seen from the visible side) for light rays at specific wavelengths only, but impossible to attain a low reflectance for light rays over all wavelengths, so that contrast has been insufficient.

Accordingly, in order to effect excellent black display, development of a single polarizing film type liquid crystal display device employing two sheets of retardation films has been under way, but has not reached a stage as yet where sufficient contrast is achieved.

Also, a single polarizing film type liquid crystal display device employing a compensation layer having a structure twisted in the direction opposite to the twist direction of a liquid crystal layer in place of a retardation film has been disclosed in, for example, Japanese Patent Laid-open Publication JP. 10-123505, A. However, even with introduction of such a construction, it has been difficult to attain a low reflectance for light rays over all wavelengths.

Further, with the single polarizing film type conventional liquid crystal display device described in the foregoing, it is not possible to install a backlight because the reflector does not allow light rays to pass therethrough, so that display can not be seen at places where external light is weak or at night.

Accordingly, there has been developed a transflective liquid crystal display device, employing a half-mirror made of a thin film of aluminum, formed by the vapor deposition method or the sputtering method, or having a reflector provided with an opening for every pixel, so that display is effected by light rays emitted from a backlight at places where external light is weak or at night.

In the case of the single polarizing film type liquid crystal display device, however, a liquid crystal element and optical elements such as a retardation film, and so forth need to be designed such that display in excellent black and white can be obtained by controlling outgoing of reflected light with a sheet of the polarizing film in a state where incident light passes through the liquid crystal element back and forth at the time of reflective display using external light.

On the other hand, at the time of transmissive display using a backlight, since light emitted from the backlight passes through the liquid crystal element only once, the liquid crystal element and the optical elements need to be designed such that display in excellent black and white can be obtained in such a condition as described above by controlling outgoing of reflected light with one sheet of the polarizing film. For these reasons, it has been difficult to obtain high contrast in both reflective display and transmissive display.

A liquid crystal display device having a reflector provided with an opening for every pixel has been disclosed in, for example, Japanese Patent Laid-open JP, 10-282488, A, however, no description on the conditions concerning a liquid crystal element and optical elements has been given therein at all, and no description on how to achieve good contrast at the time of both reflective display and transmissive display has been given therein at all.

The invention has been developed in view of the technical background described above, and an object of the invention is to provide a single polarizing film type liquid crystal display device to realize bright display in high contrast by obtaining excellent black display at low reflectance for light rays over all wavelengths.

Further, it is an another object of the invention to provide a single polarizing film type liquid crystal display device, capable of effecting reflective display by use of external light and transmissive display by lighting up a backlight, and achieving high contrast at the time for both reflective display and transmissive display.

DISCLOSURE OF THE INVENTION

In order to achieve the objects described above, the liquid crystal display device according to the invention is a reflective liquid crystal display device, employing a single polarizing film method, which comprises: a liquid crystal element comprised of a twist aligned nematic liquid crystal layer sandwiched between a first substrate having a reflector and first electrodes, and a second substrate having second electrodes; a twisted retardation film deposited on the outer side (a side thereof, opposite from the side facing the nematic liquid crystal layer) of the second substrate of the liquid crystal element; and further a retardation film and a polarizing film which are sequentially deposited in that order on the outer side of the twisted retardation film.

Further, the invention can also provide a transflective liquid crystal display device comprising: a liquid crystal element comprised of a twist aligned nematic liquid crystal layer sandwiched between a first substrate thereof, provided with a transflective reflector and first electrodes, and a second substrate thereof, provided with second electrodes; a twisted retardation film deposited on the outer side of the second substrate of the liquid crystal element; further, a first retardation film and a first polarizing film sequentially deposited in that order on the outer side of the twisted retardation film together with a second retardation film, a second polarizing film, and a backlight which are sequentially deposited in that order on the outer side (a side thereof, opposite from the side facing the nematic liquid crystal layer) of the first substrate of the liquid crystal element.

Further, in such case, a third retardation film is preferably installed between the second retardation film and the second polarizing film such that the phase delay axis of the second retardation film crosses the phase delay axis of the third retardation film substantially at right angles, wavelength dependency of a retardation value of the second retardation film differs from wavelength dependency of a retardation value of the third retardation film, and the difference between the retardation value of the second retardation film and the retardation value of the third retardation film is substantially equal to one quarter wavelength.

Or the phase delay axis of the second retardation film may intersect the phase delay axis of the third retardation film substantially at 60 degrees, and a retardation value of the second retardation film may be substantially equal to one quarter wavelength while a retardation value of the third retardation film may be substantially equal to half wavelength.

With the liquid crystal display device having these features, it is preferable that a twist direction of the twisted retardation film is rendered opposite to a twist direction of the liquid crystal element, a twist angle of the twisted retardation film is rendered smaller than a twist angle of the liquid crystal element by a range of 10° to 20°, and a Δnd value of the twisted retardation film, indicating birefringent tendency thereof, is rendered smaller than a Δnd value of the liquid crystal element, indicating birefringent tendency thereof, by a range of 0.2 to 0.3 μm.

Furthermore, the invention can provide a color liquid crystal display device by providing filters in plurality of colors on either substrate of the first substrate and the second substrate of the liquid crystal element.

Still further, a diffusion film is preferably deposited on the outer side of the second substrate of the liquid crystal element.

The transflective reflector may be a thin metal film with a thickness in a range of 0.03 to 0.01 μm, or a thin metal film provided with an opening defined at every spot corresponding to respective pixels.

BEST MODE FOR CARRYING OUT THE INVENTION

In order to elucidate the invention in more details, preferred embodiments of a liquid crystal display device according to the invention will be described hereinafter with reference to the accompanying drawings.

First Embodiment: FIGS. 1 to 4, and FIG. 17

A first embodiment of a liquid crystal display device according to the invention is first described with reference to FIGS. 1 to 4.

Figure 1:
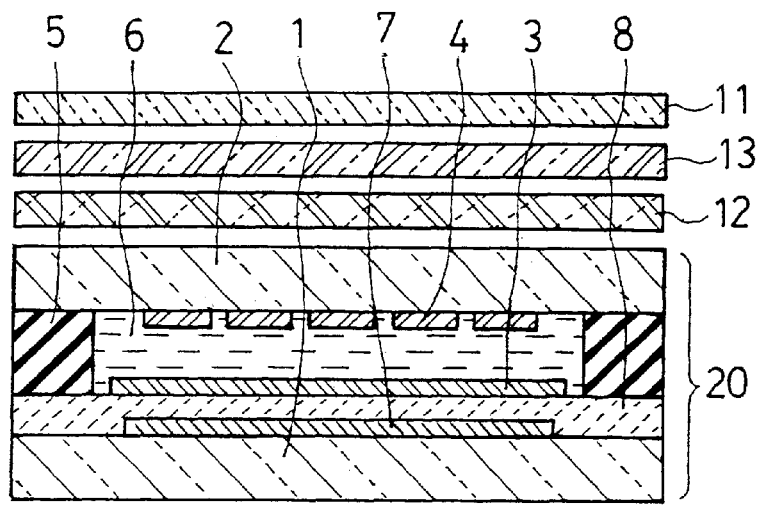
FIG. 1 is a schematic sectional view showing the constitution of a first embodiment of a liquid crystal display device according to the invention.
Figure 2:
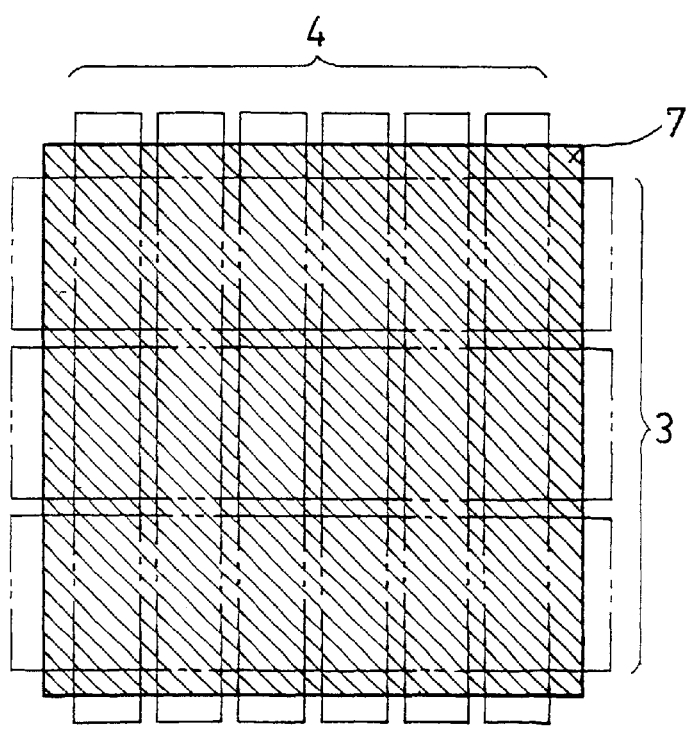
FIG. 2 is a plan view showing a planar configuration among a reflector, first electrodes, and second electrodes of the liquid crystal display device.

FIG. 1 is a schematic sectional view showing the constitution of the liquid crystal display device, and FIG. 2 is a plan view showing a planar configuration among a reflector, first electrodes, and second electrodes, installed in the device.

As shown in FIG. 1, the liquid crystal display device is comprised of a liquid crystal element 20, and a twisted retardation film 12, a retardation film 13, and a polarizing film 11, which are sequentially deposited in that order on the visible side (the upper side in FIG. 1) of the liquid crystal element 20.

The polarizing film 11, the retardation film 13, and the twisted retardation film 12, are integrally bonded with each other by use of an acrylic resin based adhesive, and are pasted to a face of a second substrate 2 of the liquid crystal element 20, on the outer side (a side opposite from the side facing a nematic liquid crystal layer 6) thereof, by use of an acrylic resin based adhesive.

The liquid crystal element 20 is comprised of: a first substrate 1, and the second substrate 2, made up of a glass sheet 0.5 mm thick, respectively, and bonded with each other at the periphery thereof with a sealant 5, and the nematic liquid crystal layer 6 which are twisted 240° counterclockwise and sealed in a gap formed between the first substrate 1 and the second substrate 2 to be held therein-between.

On the inner face of the first substrate 1, a reflector 7, 0.1 $\mu$m thick, made of aluminum, and a protective film 8 made of an acrylic material, 2 $\mu$m thick, covering the reflector 7, are formed, and first electrodes 3 made up of an indium tin oxide (ITO) film which is a transparent and electrically conductive film are formed further on top of the protective film 8. On the inner face of the second substrate 2 as well, second electrodes 4 made up of an ITO film are formed.

The first electrodes 3 and the second electrodes 4 are patterned in a multitude of stripes in such a way as to cross each other at right angles as shown by phantom lines in FIG. 2. Spots where the first electrodes 3 and the second electrodes 4 cross and superpose each other, respectively, constitute respective pixels.

An alignment film (although not shown) is formed on the surface of the protective film 8 of the first substrate 1 with the first electrodes 3 formed thereon, and on the inner face of the second substrate 2 with the second electrodes 4 formed thereon, respectively.

Transmittance of the first electrodes 3 and the second electrodes 4, made up of the ITO film, is important in respect of brightness. The lower a sheet resistance value of the ITO film, the thicker the thickness of the film becomes, thereby lowering transmittance.

With this embodiment, data signals are applied to the second electrodes 4, and accordingly, an ITO film having a sheet resistance value at about 100 ohms, and a thickness in the order of 0.05 $\mu$m is used for the second electrodes 4 so that the effect of cross talk can be reduced. An average transmittance of the ITO film is about 92%.

Further, scanning signals are applied to the first electrodes 3, and accordingly, an ITO film having a sheet resistance value at about 10 ohms, and a thickness in the order of 0.03 $\mu$m is used for the first electrodes 3 in order to reduce cross talk. An average transmittance of the ITO film is a little lower at about 89%, however, brightness of images in display can be improved by use of a transparent electrode having a transmittance at 90% or more for at least one of the electrodes.

The reflector 7 comprises a thin aluminum film formed on the inner face of the first substrate 1 by the sputtering method, and a SiO$_2$ film, 0.03 $\mu$m thick, formed on the surface of the thin aluminum film by the sputtering method to protect the surface thereof, and is formed in a square shape or a rectangular shape, large enough to cover a display region in whole, including all of the respective pixels where the first electrodes 3 and the second electrodes 4 cross and superpose each other, respectively, as indicated by the phantom lines in FIG. 2.

The reflector 7 is more preferably formed such that the surface thereof has projections and depressions to gain scattering property because of improvement in viewing angle characteristics.

The twisted retardation film 12 is a film formed by applying a polymer of liquid crystalline nature, having a twist structure, to a triacetylcellulose (TAC) film or a polyethylene terephthalate (PET) film, after alignment treatment, turning the polymer into liquid crystal state by heating to a high temperature around 150° C., and rapidly cooling the same to room temperature after adjustment of a twist angle thereof, thereby fixing a twisted condition thereof.

Otherwise, the twisted retardation film 12 may be a film formed by applying a polymer of liquid crystalline nature, having a twist structure, to a film prepared separately with an alignment treatment already applied thereto, turning the polymer into liquid crystal state by heating to a high temperature around 150° C., and rapidly cooling the same to room temperature after adjustment of a twist angle thereof, thereby fixing a twisted condition thereof as with the above-mentioned case, and thereafter transferring the polymer of liquid crystalline nature to a TAC film.

With this embodiment, the twisted retardation film 12, twisted clockwise, having a twist angle Tc of –220°, and Rc at 0.60 $\mu$m, which is a $\Delta$nd value indicating birefringent tendency, is employed.

The polarizing film 11 is preferably as bright as possible, and its degree of polarization is preferably as high as possible. With this embodiment, material having a degree of polarization of 99.9% at a transmittance of 45% is used for the polarizing film.

By providing an anti-reflection layer having reflectance in the order of 0.5%, formed by coating the surface of the polarizing film 11 with inorganic thin films in a plurality of layers, each having different refractive index, by use of the vapor deposition method or the sputtering method, surface reflectance of the polarizing film 11 is lowered, so that brightness of images is enhanced. Also, since a blackness level is lowered, contrast is improved as well.

However, since the inorganic thin films are expensive, there has since been developed a coating type anti-reflection film coated with an organic material in one to two layers. Such an anti-reflection film has a somewhat high reflectance around 1%, however, its price is low. The above-described anti-reflection film is good enough for use as the anti-reflection layer of the liquid crystal display device.

The retardation film 13 is a transparent film about 70 82 m thick, formed by drawing polycarbonate (PC), and has a retardation value F1 of 0.63 $\mu$m at a wavelength of 0.55 $\mu$m.

Hereinafter, a configuration among respective constituent members of the liquid crystal display device is described with reference to FIGS. 3 and 4. As for angles shown in these figures, an angle rotated counterclockwise relative to the horizontal axis, as seen from the visible side, is expressed in plus, and an angle rotated clockwise relative thereto is expressed in minus.

An alignment film (not shown) is formed on the surface of the first electrodes 3 and the second electrodes 4 of the liquid crystal element 20 described above, respectively, and as shown in FIG. 3, a lower liquid crystal molecule alignment direction 6a points at +30° by applying a rubbing treatment to the inner face of the first substrate 1 in the direction extending upward to the right at 30° to the horizontal axis while an upper liquid crystal molecule alignment direction 6b points at −30° by applying a rubbing treatment to the inner face of the second substrate 2 in the direction extending downward to the right at 30° to the horizontal axis.

The liquid crystal element 20 of an STN mode, having a twist angle Ts of 240° counterclockwise, is formed by adding an optical rotatory substance called chiral to the nematic liquid crystal layer 6 having viscosity at 20 cP, and adjusting a twist pitch P to 11 $\mu$m.

A birefringence difference $\Delta$n of the nematic liquid crystal layer 6 to be used is set at 0.15, and clearance between the first substrate 1 and the second substrate 2, that is, a cell gap d is set at 5.6 $\mu$m.

Accordingly, a $\Delta$nd value Rs indicating birefringent tendency of the liquid crystal element 20 as expressed by the product of the birefringence difference $\Delta$n of the nematic liquid crystal layer 6 and the cell gap d becomes 0.84 $\mu$m.

Figure 4:
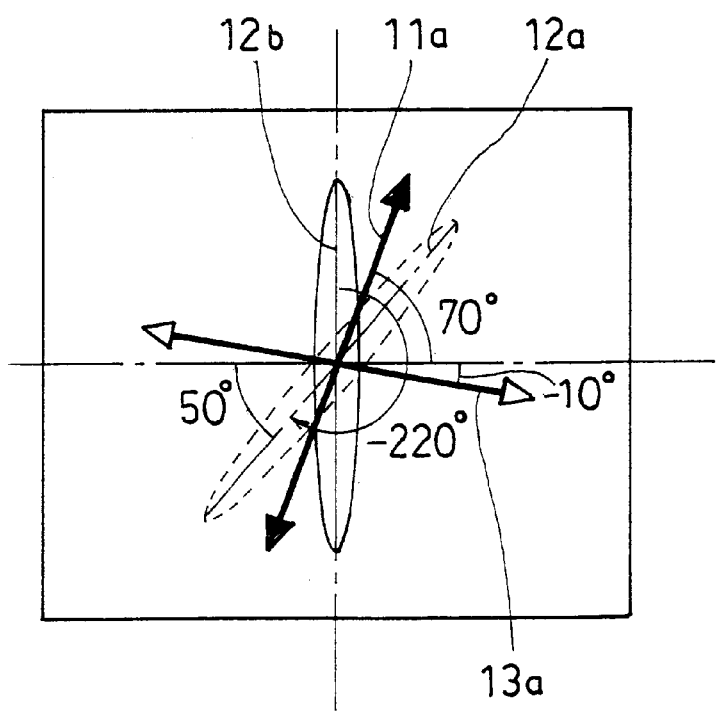
FIG. 4 is a view illustrating a relationship among a twist angle of a twisted retardation film, a phase delay axis of a retardation film, and a transmission axis of a polarizing film of the liquid crystal display device.

Further, as shown in FIG. 4, the polarizing film 11 is disposed such that a transmission axis 11a thereof is at an angle of +70° on the basis of the horizontal axis. Meanwhile, the twisted retardation film 12 is disposed such that a lower molecular alignment direction 12a thereof is at an angle of +50° on the basis of the horizontal axis, and an upper molecular alignment direction 12b thereof is at 90°. Consequently, the twisted retardation film 12 will have a twist angle Tc of 220° in the clockwise direction, and the difference $\Delta$t in absolute value between the twist angle Tc, and the twist angle Ts of the liquid crystal element 20 is represented as follows:

$$\Delta t = Ts - Tc = 20°$$

The twisted retardation film 12 has Rc of 0.60 $\mu$m, which is the $\Delta$nd value indicating the birefringent tendency thereof, and the difference $\Delta$R in birefringent tendency between the $\Delta$nd value Rc and the $\Delta$nd value Rs indicating the birefringent tendency of the liquid crystal element 20 is represented as follows:

$$\Delta R = Rs - Rc = 0.24 \ \mu m$$

Further, since the retardation film 13 is disposed such that a phase delay axis 13a thereof is at an angle of −10° on the basis of the horizontal axis, an intersection angle formed by the phase delay axis 13a of the retardation film 13 and the transmission axis 11a of the polarizing film 11 becomes 80°.

Next, the operation and effect of the liquid crystal display device according to the first embodiment of the invention is described hereinafter by referring to FIG. 17 as well.

In the case where an intersection angle formed by the lower molecular alignment direction 12a of the twisted retardation film 12 and the upper liquid crystal molecule alignment direction 6b of the liquid crystal element 20 is around 90°, the birefringent tendency of the liquid crystal element 20 is subtracted by the birefringent tendency of the twisted retardation film 12.

Accordingly, the birefringent tendency of the liquid crystal element 20 is subtracted by the birefringent tendency of the twisted retardation film 12, and with this embodiment, $\Delta R = 0.24$ $\mu$m. However, as the nematic liquid crystal layer 6 of the liquid crystal element 20 are twisted, a real retardation value as for the retardation film becomes around 0.14 $\mu$m, equivalent to a quarter wavelength.

Further, with this embodiment, by rendering an intersection angle formed by the lower molecular alignment direction 12a of the twisted retardation film 12 and the upper liquid crystal molecule alignment direction 6b of the liquid crystal element 20 to be around 80°, and by rendering the twist angle Tc of the twisted retardation film 12 smaller than the twist angle Ts of the liquid crystal element 20, display color is corrected such that excellent black display and white display can be effected.

If the twist angle Tc of the twisted retardation film 12 is too small in comparison with the twist angle Ts of the liquid crystal element 20, subtraction in birefringent tendency becomes insufficient, and consequently, the difference in absolute value between the twist angles, $\Delta t = Ts - Tc$, is preferably in a range of 10° to 30°. Further, with the difference in birefringent tendency, $\Delta R = Rs - Rc$, falling in a range of 0.2 $\mu$m to 0.3 $\mu$m, display can be effected.

In the case where the intersection angle formed by the transmission axis 11a of the polarizing film 11 and the phase delay axis 13a of the retardation film 13 is 90°, no retardation occurs at all, however, as with the case of this embodiment, by rendering the intersection angle formed by the transmission axis 11a of the polarizing film 11 and the phase delay axis 13a of the retardation film 13 to be 80°, minuscule retardation is caused to occur, thereby correcting retardation for every wavelength.

Figure 17:
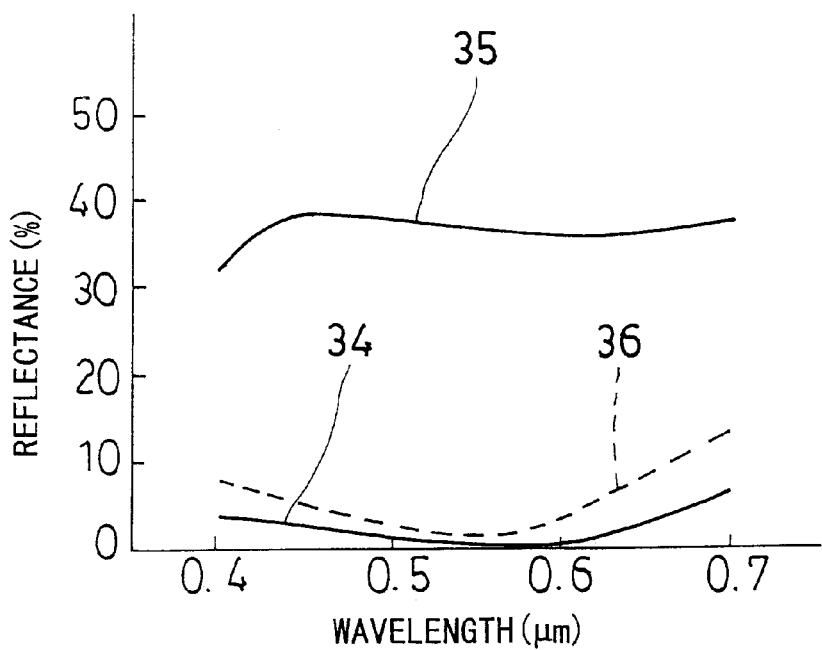
FIG. 17 is a diagram showing a spectral reflectance curve of the first embodiment of the liquid crystal display device according to the invention.

FIG. 17 is a diagram showing reflection characteristics of the single polarizing film type liquid crystal display device according to this embodiment, in relation to wavelengths of incident light.

A curve 34 indicates reflectance in a black display state when no voltage is applied between the first electrodes 3 and the second electrodes 4 (at the time of no voltage being applied) while a curve 35 indicates reflectance in a white display state when an "on" voltage is applied therebetween.

A curve 36 indicates reflectance in a black display state when no voltage is applied to a single polarizing film type liquid crystal display device, employing an ordinary quarter-wave film made up of only one sheet of PC film as a retardation film, shown just for the sake of comparison.

In FIG. 1, linearly polarized light entered through the polarizing film 11 from the upper visible side is turned into circularly polarized light over all wavelengths upon transmitting through the retardation film 13, the twisted retardation film 12, and the nematic liquid crystal layer 6, arriving at the reflector 7.

Then, the circularly polarized light reflected by the reflector 7 reverts to linearly polarized light with a direction of polarization rotated through 90° by transmitting again through the nematic liquid crystal layer 6, the twisted retardation film 12, and the retardation film 13, and is absorbed by the polarizing film 11, so that reflectance becomes very low as indicated by the curve 34 in FIG. 17, and thereby perfect black display can be effected.

As a single polarizing film type conventional liquid crystal display device is not provided with the twisted retardation film 12, employing only one sheet of retardation film, it has been impossible to sufficiently lower reflectance of light rays at shorter wavelengths as well as longer wavelengths as indicated by the curve 36 in FIG. 17. As a result, perfect black display can not be effected when no voltage is applied, and black display is tainted with purple, thus lowering contrast.

When a voltage is applied between the first electrodes 3 and the second electrodes 4, liquid crystal molecules of the nematic liquid crystal layer 6 are caused to rise, thereby reducing a real Δnd value of the liquid crystal element 20.

Consequently, linearly polarized light entered through the polarizing film 11 from the visible side reverts to elliptically polarized light and linearly polarized light upon transmitting through the retardation film 13, the twisted retardation film 12, and the nematic liquid crystal layer 6 to which the voltage is applied.

By rendering the real Δnd value of the liquid crystal element 20 when the voltage is applied equal to the retardation value of the twisted retardation film 12, birefringent tendency which occurs can be substantially eliminated.

Accordingly, the linearly polarized light entered through the polarizing film 11 does not undergo rotation, and is reflected by the reflector 7, returning as it is to the visible side, so that reflectance becomes high over a range of all wavelengths as indicated by the curve 35 in FIG. 17, and thereby bright and excellent white display can be effected.

Thus, with the reflective liquid crystal display device according to this embodiment, excellent black display and bright white display can be obtained at the time of reflective display utilizing external light by the agency of the polarizing film 11, the retardation film 13, the twisted retardation film 12, and the liquid crystal element 20 incorporating the reflector 7, thereby enabling display in high contrast to be effected. Variations of First Embodiment With the first embodiment of the invention as described above, a liquid crystal element of an STN mode, twisted by 240°, is used as the liquid crystal element 20, however, a similar reflective liquid crystal display device can be obtained by use of a TN liquid crystal element having a twist angle around of 90 degrees.

In the case of displaying on a large screen by use of the TN liquid crystal element, it is preferable to adopt a reflective liquid crystal display device of an active-matrix composed of active elements such as thin film transistors (TFTs), and thin film diodes of a metal-insulator-metal (MIM) structure, and so forth.

With the first embodiment of the invention, the polymer film of liquid crystalline nature with the twisted condition thereof fixed at room temperature is used for the twisted retardation film 12. However, if a temperature compensation type twisted retardation film formed by merely bonding a portion of liquid crystal molecules with polymer molecules in chains, causing the Δnd value Rc indicating a birefringent tendency thereof to undergo changes depending on temperature, is adopted, improvement is attained on brightness and contrast at both high temperatures and low temperatures, thereby enabling more excellent display to be effected.

Further, with the first embodiment of the invention, the reflector 7 is formed separately from the first electrodes 3, however, if the first electrodes 3 are formed of a thin metal film having a high reflectance such as aluminum, silver, and the like, the first electrodes 3 can double as the reflector 7. In such a case, the construction of a liquid crystal display device can be simplified.

In addition, even if the reflector 7 is deposited on the outer side of the first substrate 1, a similar advantageous effect can be obtained in respect of high contrast obtained due to bright white display and excellent black display although shadows occur to display.

Still further, with the first embodiment of the invention, for the retardation film 13, use is made of an ordinary type retardation film formed by uniaxial drawing of polycarbonate (PC) such that a relationship among refractive index nz in the direction of the z axis, refractive index nx in the direction of the drawing, and refractive index ny in the direction orthogonal to the direction of the drawing is expressed by the following formula:

$$nx > ny = nz$$

However, the same advantageous effect can be obtained even with the use of the so-called Z type retardation film formed by multiaxial drawing of polycarbonate (PC) such that a relationship of the respective refractive indices is expressed by the formula, nx>nz>ny, or with the use of a retardation film formed by drawing material such as polyvinylalcohol (PVA), polypropylene (PP), acrylic resin, polystyren, and so forth.

Figure 5:
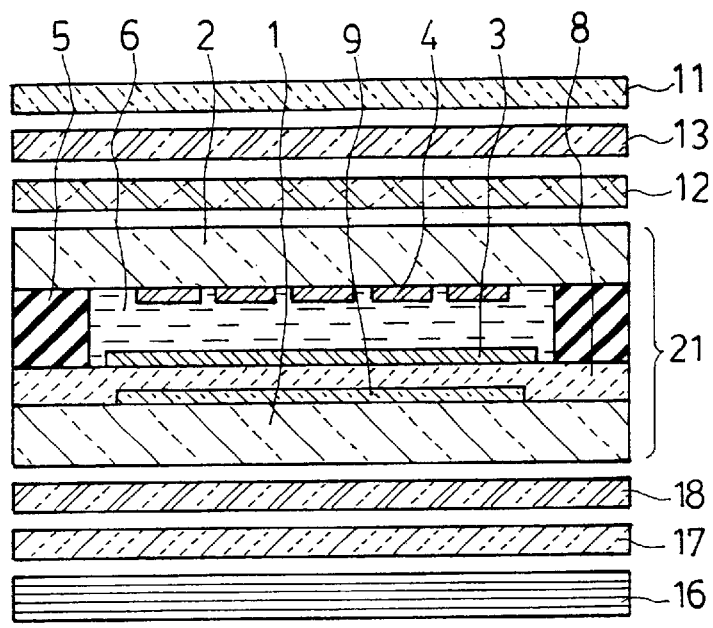
FIG. 5 is a schematic sectional view showing the constitution of a second embodiment of a liquid crystal display device according to the invention.
Figure 6:
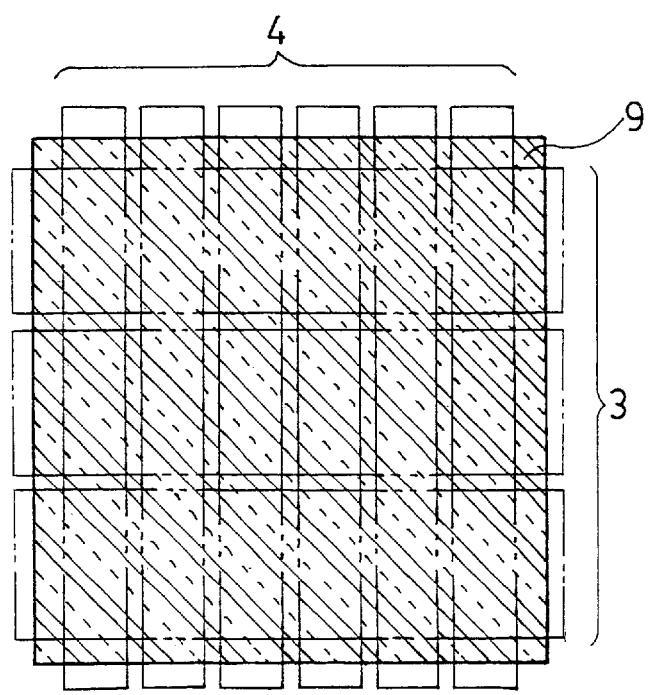
FIG. 6 is a plan view showing a planar configuration among a transflective reflector, first electrodes and second electrodes of the liquid crystal display device.
Figure 7:
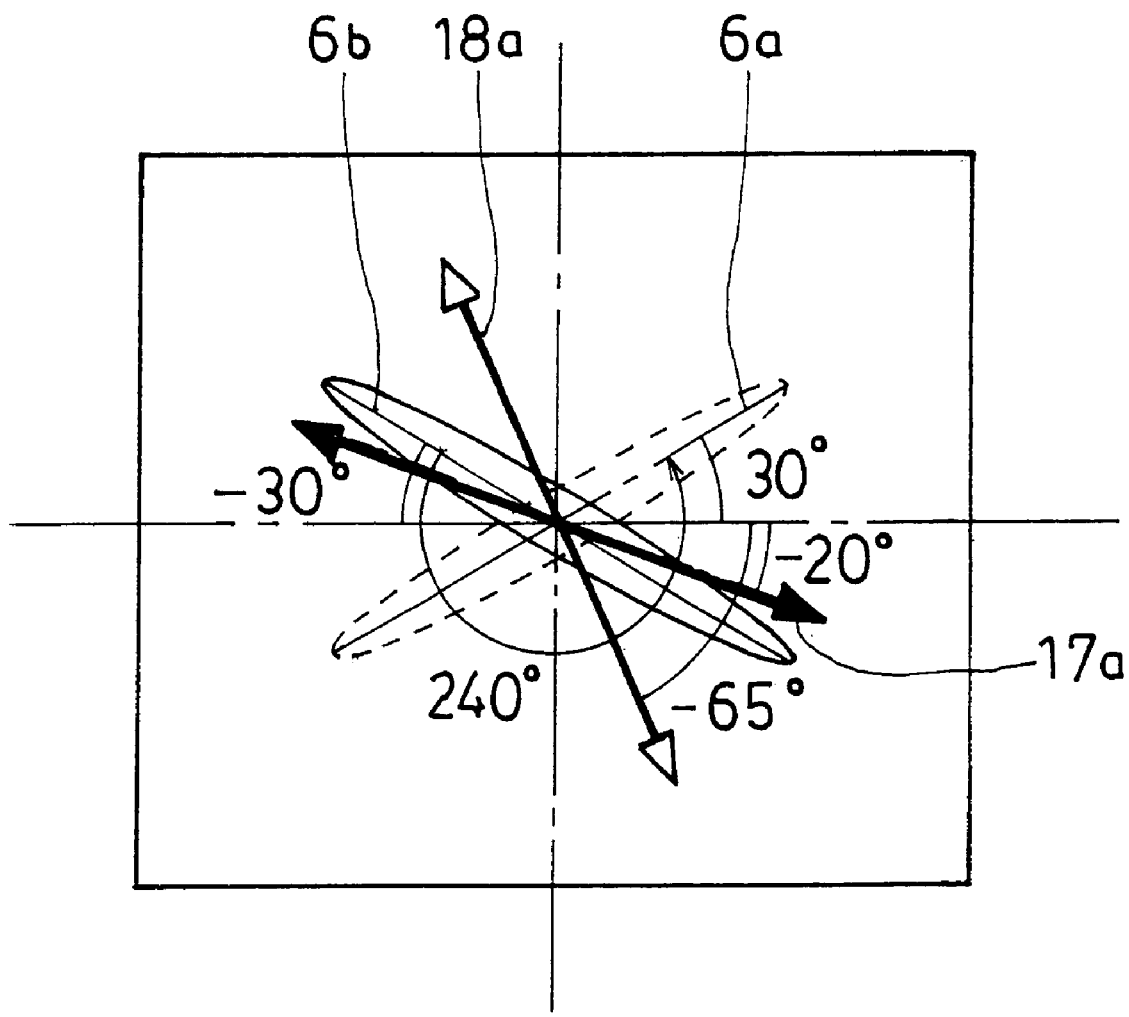
FIG. 7 is a view illustrating a relationship among a twist angle of a liquid crystal element, a phase delay axis of a second retardation film, and a phase delay axis of a second polarizing film of the liquid crystal display device.

Second Embodiment: FIGS. 5 to 7

Subsequently, a second embodiment of a liquid crystal display device according to the invention is described hereinafter.

Figure 3:
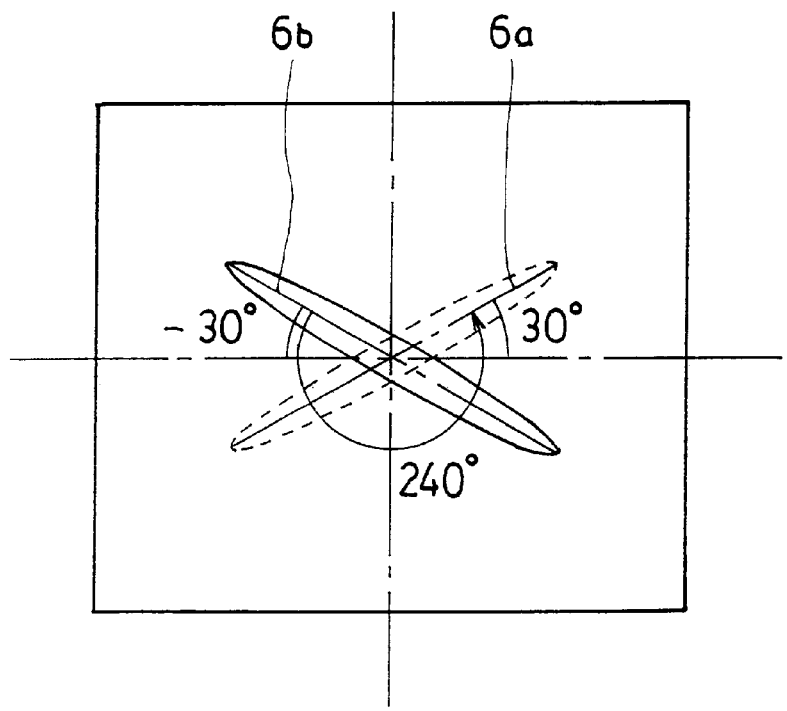
FIG. 3 is a view illustrating a twist angle of a liquid crystal element of the liquid crystal display device.

FIGS. 5 to 7 correspond to FIGS. 1 to 3 used for illustrating the first embodiment of the liquid crystal display device as described in the foregoing, and in these figures, parts corresponding to those in FIGS. 1 to 3 are denoted by the like reference numerals, description thereof is simplified or omitted.

The liquid crystal display device according to the second embodiment of the invention is a transflective liquid crystal display device made up by adding a second retardation film 18, a second polarizing film 17, and a backlight 16 to the liquid crystal display device according to the first embodiment, and capable of effecting transmissive display as well.

A liquid crystal element 21 comprising this liquid crystal display device differs from the liquid crystal element 20 of the liquid crystal display device according to the first embodiment only in that a transflective reflector 9 is installed in place of the reflector 7 of the liquid crystal element 20.

As with the case of the first embodiment, a twisted retardation film 12, a first retardation film 13, and a first polarizing film 11 are sequentially deposited in that order on the outer side (the visible side) of a second substrate 2 of the liquid crystal element 21 provided that the retardation film 13 and the polarizing film 11 as designated in the first embodiment are referred to as the first retardation film 13 and the first polarizing film 11, respectively, in the second embodiment.

Further, a second retardation film 18 and a second polarizing film 17 are sequentially deposited in that order on the outer side (a side opposite from the visible side) of a first substrate 1 of the liquid crystal element 21, and a backlight 16 is installed further on the outer side of the second polarizing film 17.

The second retardation film 18, and the second polarizing film 17 are integrally joined with each other by an acrylic resin based adhesive, and are bonded to the liquid crystal element 21 as well by an acrylic resin based adhesive.

The transflective reflector 9 formed on the inner face of the first substrate 1 is made up of an aluminum film formed by the sputtering method, and serves as the so-called half-mirror allowing a portion of incident light to transmit therethrough while reflecting the rest by rendering the aluminum film very thin in thickness.

With this embodiment, since the thickness of the aluminum film is set to 0.02 μm, about 10 to 20% of light is transmitted therethrough while remaining 80 to 90% of the light is reflected, and the transflective reflector 9 is formed in a square shape or rectangular shape large enough to cover a display region in whole, including all of respective pixels where first electrodes 3 and second electrodes 4 cross, and superpose each other, respectively, as shown by phantom lines in FIG. 6.

The second retardation film 18 is a transparent film, about 70 μm in thickness, formed by drawing polycarbonate (PC), and has a retardation value F3 of 0.14 μm at a wavelength of 0.55 μm, equivalent to that of a quarter-wavelength film.

As it is important that the second polarizing film 17 has a high degree of polarization, a polarizing film having a transmittance of 44% and a degree of polarization of 99.99% is adopted for the second polarizing film 17.

For the backlight 16, a light guide plate provided with a fluorescent light or an LED, or an electroluminesecnt (EL) film may be used, however, with this embodiment, an EL film about 1 mm thick, emitting white light, is used for the backlight 16.

Next, a planar configuration among respective constituent members of the liquid crystal display device is described with reference to FIG. 7. Since a configuration of a lower molecular alignment direction 12a of the twisted retardation film 12 deposited on the upper side of the liquid crystal element 21 in FIG. 5 relative to an upper molecular alignment direction 12b thereof, and a configuration of a phase delay axis 13a of the first retardation film 13 relative to the transmission axis 11a of the first polarizing film 11 are the same as those for the first embodiment shown in FIG. 4, description thereof is omitted.

As shown in FIG. 7, the second retardation film 18 is disposed on the underside of the liquid crystal element 21 such that a phase delay axis 18a thereof is oriented at −65° on the basis of the horizontal axis, and the second polarizing film 17 is disposed such that a transmission axis 17a thereof is oriented at −20° on the basis of the horizontal axis, thereby crossing the transmission axis 11a (refer to FIG. 4) of the first polarizing film 11 at right angles.

Also, a lower liquid crystal molecule alignment direction 6a as well as an upper liquid crystal molecule alignment direction 6b of the liquid crystal element 21 as shown in FIG. 7, and a twist angle formed thereby are the same as those for the first embodiment shown in FIG. 3.

Next, the operation and effect of the liquid crystal display device according to this embodiment is described hereinafter.

As for reflective display, the operation of the liquid crystal display device is the same as that for the first embodiment, so that display in excellent contrast can be effected.

Accordingly, transmissive display effected when the backlight 16 is lit up is described hereinafter.

Light emitted by the backlight 16 and sent out therefrom is transmitted through the second polarizing film 17, and is turned into linearly polarized light polarized in the direction of the transmission axis 17a thereof. The linearly polarized light falls on the second retardation film 18 at an angle of 45° relative to the phase delay axis 18a thereof, and is thereby turned into circularly polarized light. Thereafter, about 80% of the circularly polarized light is reflected by the transflective reflector 9 inside the liquid crystal element 21, but remaining 20% of the circularly polarized light is transmitted therethrough.

In a state where no voltage is applied to the liquid crystal element 21, birefringent tendency is equivalent to a quarter-wavelength for light rays over substantially all wavelengths by the agency of the twisted retardation film 12, the liquid crystal element 21, and the first retardation film 13.

Accordingly, retardation occurring to the second retardation film 18 is subtracted by retardation occurring to the liquid crystal element 21, the twisted retardation film 12, and the first retardation film 13, and the difference therebetween becomes zero, whereupon the circularly polarized light is turned into linearly polarized light polarized in the direction identical to that of the transmission axis 17a of the second polarizing film 17 before outgoing.

Since the transmission axis 11a of the first polarizing film 11 crosses the transmission axis 17a of the second polarizing film 17 at right angles, the light incoming from the backlight 16 through the second polarizing film 17 is not transmitted through the first polarizing film 11, and is not sent out to the visible side, thus effecting black display.

When a voltage is applied between first electrodes 3 and second electrodes 4, liquid crystal molecules of the nematic liquid crystal layer 6 are caused to rise, and an effective Δnd value of the liquid crystal element 21 decreases.

Consequently, the linearly polarized light incoming from the backlight 16 through the second polarizing film 17 is turned into circularly polarized light passing through the second retardation film 18, but is further turned into elliptically polarized light or linearly polarized light as a result of transmitting through the twisted retardation film 12 and the liquid crystal element 21.

When retardation occurring in the liquid crystal element 21 is rendered equal to a quarter-wavelength by applying the voltage thereto, the linearly polarized light incoming through the second polarizing film 17 has the direction of polarization rotated by 90° after further transmitting through the twisted retardation film 12, and the first retardation film 13, and is thereby transmitted through the first polarizing film 11, thus outgoing to the visible side. As a result, excellent white display can be effected.

Thus, with the liquid crystal display device according to this embodiment, excellent black display and bright white display can be effected at the time of reflective display utilizing external light by the agency of the first polarizing film 11, the first retardation film 13, the twisted retardation film 12, and the liquid crystal element 21 incorporating the transflective reflector 9. Further, by the agency of the second retardation film 18, the second polarizing film 17, and the backlight 16 that are installed on the underside of the liquid crystal element 21, display in good contrast can be effected by lighting up the backlight 16 in an environment where external light is insufficient. That is, this embodiment can provide a transflective liquid crystal display device employing a single polarizing film method, effecting display of high quality.

Variations of Second Embodiment

With the second embodiment described above, the transflective reflector 9 is made up of a thin aluminum film 0.02 μm thick, however, a half-mirror allowing a portion of light rays to pass therethrough and reflecting the rest may be used instead provided that a thickness thereof falls in a range of 0.03 μm to 0.01 μm.

Further, for the transflective reflector 9, a thin aluminum film is used, however, a thin film made of an aluminum alloy or silver, or a multilayer film composed of an aluminum film and an inorganic oxide film may be used instead for further improvement in reflectance.

Further, with the second embodiment described above, a configuration is adopted such that the retardation occurring to the second retardation film 18 is subtracted by the retardation occurring to the liquid crystal element 21, however, another configuration may be adopted instead such that the retardation occurring to the second retardation film 18 is added to that occurring to the liquid crystal element 21 so that the sum thereof becomes equivalent to a half-wavelength, and further, the transmission axis 17a of the second polarizing film 17 is disposed in parallel with the transmission axis 11a of the first polarizing film 11.

Figure 8:
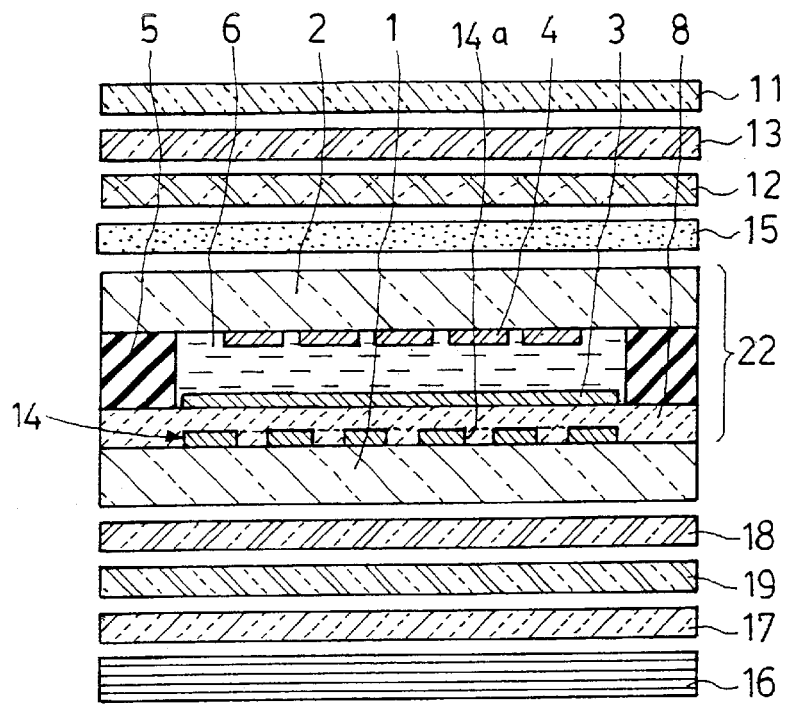
FIG. 8 is a schematic sectional view showing the constitution of a third embodiment of a liquid crystal display device according to the invention.
Figure 9:
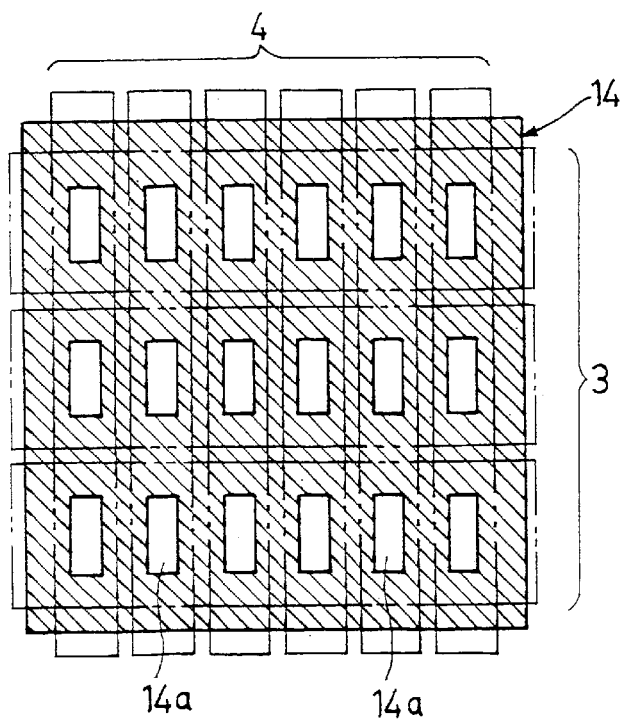
FIG. 9 is a plan view showing a planar configuration among a transflective reflector, first electrodes, and second electrodes of the liquid crystal display device.
Figure 10:
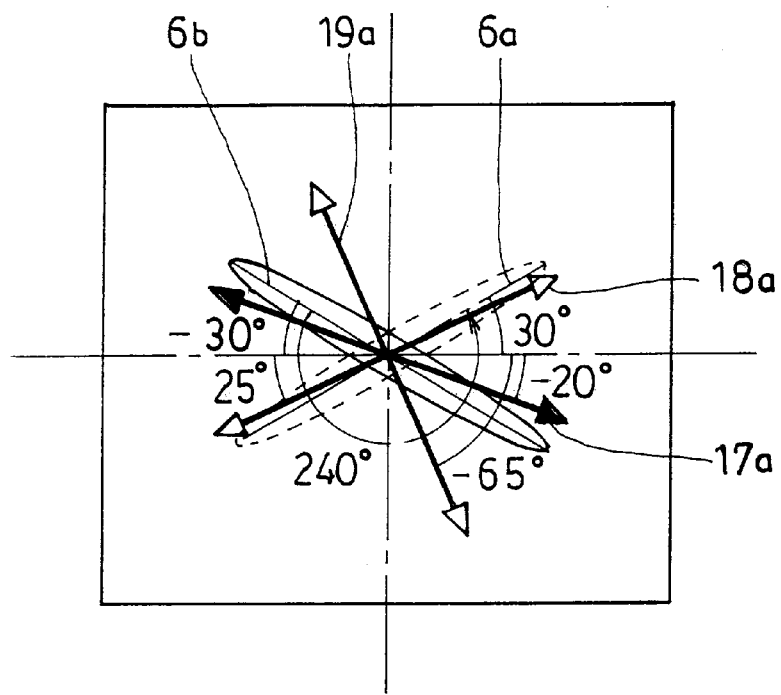
FIG. 10 is a view illustrating a relationship among a twist angle of a liquid crystal element, a phase delay axis of a second retardation film, a third retardation film, and a second polarizing film, respectively, of the liquid crystal display device.

Third Embodiment: FIGS. 8 to 10

Subsequently, a third embodiment of a liquid crystal display device according to the invention is described hereinafter.

FIGS. 8 to 10 correspond to FIGS. 1 to 3 used for illustrating the first embodiment of the liquid crystal display device as described in the foregoing, and FIGS. 5 to 7 used for illustrating the second embodiment of the liquid crystal display device. In FIGS. 8 to 10, parts corresponding to those in the above-described figures are denoted by the like reference numerals, and description thereof is omitted or simplified.

With the liquid crystal display device according to the third embodiment, a liquid crystal element 22 is somewhat different from the liquid crystal element 21 of the second embodiment. More specifically, a transflective reflector 14 formed on the inner face of a first substrate 1 of the liquid crystal element 22 is an aluminum film, 0.1 $\mu$m thick, and as shown in FIG. 9, is provided with an opening 14a defined at every spot corresponding to respective pixels where first electrodes 3 and second electrodes 4 cross, and superpose each other, respectively. The respective openings 14a are defined by the photolithographic process.

As the aluminum film composing the transflective reflector 14 has a thickness thicker than that of the transflective reflector 9 of the second embodiment, all portions of the transflective reflector 14, other than the openings 14a are able to act as a perfect reflector, so that transmittance and reflectance can be adjusted by varying an area of the respective openings 14a. With this embodiment, the area of the respective openings 14a is set to represent 30% of an area of the respective pixels, thereby allowing about 30% of light rays to be transmitted, and remaining about 70% of the light rays to be reflected.

Further, with the liquid crystal display device according to this embodiment, a diffusion film 15 is installed directly on the outer side (the visible side) of a second substrate 2 of the liquid crystal element 22, and on the outer side of the diffusion film 15, a twisted retardation film 12, a first retardation film 13, and a first polarizing film 11 are sequentially deposited in that order.

Further, on the outer side (a side opposite from the visible side) of the first substrate 1 of the liquid crystal element 22, a second retardation film 18, a third retardation film 19, and a second polarizing film 17 are sequentially deposited in that order, and a backlight 16 is installed on the outer side of the second polarizing film 17.

The first polarizing film 11, the first retardation film 13, and the twisted retardation film 12 are integrally bonded to each other with an acrylic resin based adhesive. Further, the second retardation film 18, the third retardation film 19, and the second polarizing film 17 are also integrally bonded to each other with an acrylic resin based adhesive. Then, either of the integrally bonded films is bonded to the liquid crystal element 22 as well with an acrylic resin based adhesive.

The diffusion film 15 is installed in order to scatter light rays reflected by the transflective reflector 14, so that bright display having a wide viewing angle can be effected. Accordingly, the diffusion film 15 capable of scattering and transmitting forward incident light rays from outside as much as possible with less back scattering is preferable because high contrast can be obtained in this way. In this case, a light scattering type adhesive 30 $\mu$m thick, composed of fine particles mixed in an adhesive, is used for the diffusion film 15, doubling as an adhesive for bonding the liquid crystal element 22 with the retardation film 12.

Further, the diffusion film 15 may be disposed anywhere between the second substrate 2 of the liquid crystal element 22 and the first polarizing film 11, or somewhere on the surface of the first polarizing film 11 since material having hardly any retardation value and unlikely to cause any change in polarization state is used for the diffusion film 15, however, the diffusion film 15 is preferably disposed as close to the second substrate 2 as possible from the viewpoint of reducing blurred spots in display.

The second substrate 2 is preferably rendered as thin in thickness as possible because blurred spots in display can be reduced in this way, and with this embodiment, a thickness of 0.5 mm is adopted. Further, the second substrate 2 may be rendered thinner than the first substrate 1 by reducing the thickness of the second substrate 2 to 0.4 mm while maintaining a thickness of the first substrate 1 at 0.5 mm.

The first polarizing film 11, the second polarizing film 17, the twisted retardation film 12, the first retardation film 13, and the backlight 16 are the same as those used for the second embodiment, respectively.

The second retardation film 18 is a transparent film about 70 $\mu$m thick, formed by drawing polycarbonate (PC), and has a retardation value F2=0.36 $\mu$m for light rays at a wavelength of 0.55 $\mu$m.

The third retardation film 19 is a transparent film about 100 $\mu$m thick, formed by drawing polypropylene (PP), and has a retardation value F3=0.50 $\mu$m for light rays at a wavelength of 0.55 $\mu$m.

Next, a planar configuration among respective constituent members of the liquid crystal display device is described with reference to FIG. 10. Since a configuration of a lower molecular alignment direction 12a of the twisted retardation film 12 deposited on the upper side of the liquid crystal element 22 in FIG. 8 relative to an upper molecular alignment direction 12b thereof, and a configuration of a phase delay axis 13a of the first retardation film 13 relative to the transmission axis 11a of the first polarizing film 11 are the same as those for the first embodiment shown in FIG. 4, description thereof is omitted.

As shown in FIG. 10, the second retardation film 18 is deposited on the underside of the liquid crystal element 22 such that a phase delay axis 18a thereof is oriented at +25° on the basis of the horizontal axis, and the third retardation film 19 is disposed such that a phase delay axis 19a thereof is oriented at −65° on the basis of the horizontal axis.

Accordingly, the phase delay axis 18a of the second retardation film 18 crosses the phase delay axis 19a of the third retardation film 19 at right angles, and the retardation value F2 of the second retardation film 18 is subtracted from the retardation value F3 of the third retardation film 19, so that an effective retardation value $\Delta F$ becomes: $\Delta F = F3 - F2 = 0.14$ $\mu$m Also, a lower liquid crystal molecule alignment direction 6a as well as an upper liquid crystal molecule alignment direction 6b of the liquid crystal element 22 as shown in FIG. 10, and a twist angle formed thereby are the same as those of the first embodiment shown in FIG. 3.

Herein, the effect of the retardation films will be described hereinafter with reference to FIG. 16.

Figure 16:
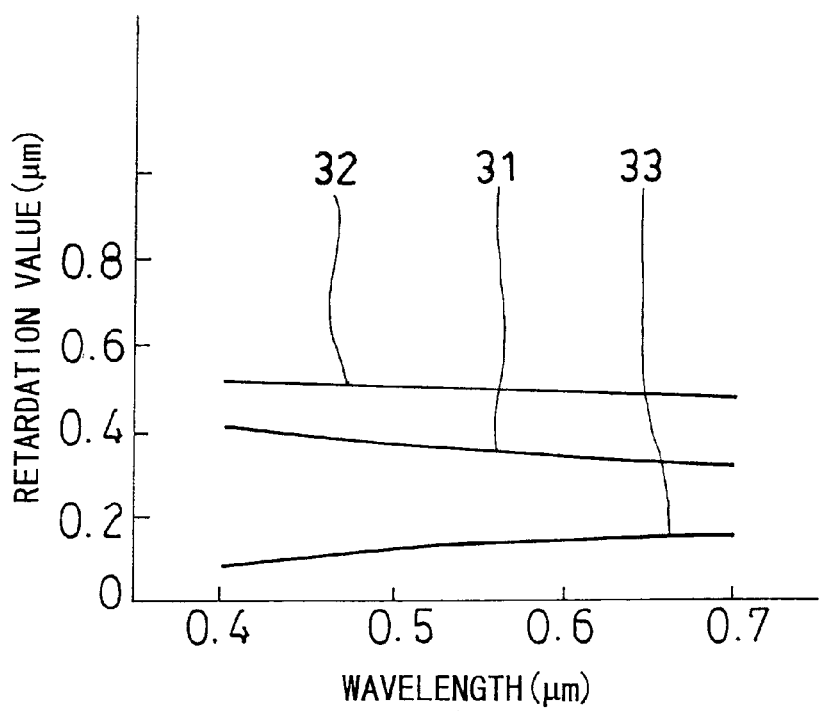
FIG. 16 is a diagram showing wavelength dependency of retardation values of the retardation films employed in the third embodiment of the liquid crystal display device according to this invention.

FIG. 16 is a characteristics diagram showing wavelength dependency of the retardation value of the retardation films used in this embodiment, respectively. The horizontal axis indicates wavelength ($\mu$m) of light rays, and the vertical axis the retardation value ($\mu$m) of the respective retardation films.

A curve 31 indicates the retardation value of the second retardation film 18, a curve 32 indicates the retardation value of the third retardation film 19, and a curve 33 indicates the retardation value when the second retardation film 18 is superposed on the third retardation film 19 such that the phase delay axis 18a crosses the phase delay axis 19a at right angles.

The constituent material of the second retardation film 18 is polycarbonate (PC) having large wavelength dependency of refractive index, and consequently, the retardation value thereof for light rays at shorter wavelengths becomes greater as indicated by the curve 31.

Meanwhile, the constituent material of the third retardation film 19 is polypropylene (PP) having small wavelength dependency of refractive index, and consequently, the retardation values thereof for light rays at shorter wavelengths are substantially the same as those for light rays at longer wavelengths, undergoing hardly any change as indicated by the curve 32.

Accordingly, by superposing the second retardation film 18 on the third retardation film 19 such that the phase delay axis 18a crosses the phase delay axis 19a at right angles so as to cause one of the retardation values to be subtracted from the other, it is possible to render a retardation value for light rays at shorter wavelengths in the vicinity of 0.4 $\mu$m smaller than that for light rays at longer wavelengths in the vicinity of 0.7 $\mu$m as indicated by the curve 33.

As a result, the quotient F/$\lambda$, a retardation value F divided by a wavelength $\lambda$, can be rendered approximately one quarter over all wavelengths, thereby enabling the so-called wide-band quarter-wavelength film to be set up.

With an ordinary quarter-wavelength film, however, retardation values at shorter wavelengths are greater than retardation values at longer wavelengths, and consequently, the quotient F/$\lambda$, a retardation value F divided by a wavelength $\lambda$ becomes greater than one quarter at shorter wavelengths, and smaller than one quarter at longer wavelengths. As a result, a polarization state undergoes a change at every wavelength.

Next, the operation and effect of the liquid crystal display device according to the third embodiment is described hereinafter.

Reflective display with the third embodiment is the same as that for the first and second embodiments, and display in excellent contrast can be effected by use of the twisted retardation film 12 and the first retardation film 13.

Accordingly, transmissive display effected when the backlight 16 is lit up is described hereinafter. Light emitted by the backlight 16 and sent out therefrom is turned into linearly polarized light polarized in the direction of the transmission axis 17a of the second polarizing film 17 upon passing therethrough. Since the linearly polarized light falls at an angle of 45° relative to the phase delay axis of the wide-band quarter-wavelength film as set up by the agency of the second retardation film 18 and the third retardation film 19, the linearly polarized light is turned into circularly polarized light.

Upon falling of the circularly polarized light on the liquid crystal element 22, about 70% of the circularly polarized light is reflected by the transflective reflector 14, but remaining 30% thereof is transmitted therethrough.

In a state where no voltage is applied to the liquid crystal element 22, birefringent tendency is equivalent to a quarter-wavelength for light rays over substantially all wavelengths by the agency of the twisted retardation film 12, the liquid crystal element 22, and the first retardation film 13.

Consequently, retardation occurring to the second retardation film 18 and the third retardation film 19 is subtracted by retardation occurring to the liquid crystal element 22, the twisted retardation film 12, and the first retardation film 13, thus the difference therebetween becomes zero, whereupon, the circularly polarized light is turned into linearly polarized light polarized in the direction identical to that of the transmission axis 17a of the second polarizing film 17 before outgoing.

However, as the transmission axis 11a of the first polarizing film 11 crosses the transmission axis 17a of the second polarizing film 17 at right angles, the linearly polarized light falling on the first polarizing film 11 is not transmitted therethrough, and is not sent out to the visible side, thereby effecting black display. With this embodiment, black display more excellent than that for the second embodiment can be effected due to use of the second retardation film 18 and the third retardation film 19.

When a voltage is applied between the first electrodes 3 and the second electrodes 4, liquid crystal molecules of the nematic liquid crystal 6 are caused to rise, and an effective $\Delta$nd value of the liquid crystal element 22 decreases. Consequently, the linearly polarized light incoming from the backlight 16 through the second polarizing film 17 is turned into circularly polarized light passing through the second retardation film 18 and the third retardation film 19, but is turned into elliptically polarized light or linearly polarized light as a result of transmitting through the twisted retardation film 12 and the liquid crystal element 22.

When a retardation value occurring in the liquid crystal element 22 is rendered equivalent to a quarter-wavelength by applying the voltage thereto, the linearly polarized light incoming through the second polarizing film 17 has the direction of polarization, rotated by 90°, after further passing through the twisted retardation film 12 and the first retardation film 13, and is transmitted through the first polarizing film 11, before being sent out to the visible side. As a result, excellent white display can be effected.

Thus, by the agency of the first polarizing film 11, the first retardation film 13, the twisted retardation film 12, and the liquid crystal element 22 incorporating the transflective reflector 14, excellent black display and bright white display can be effected at the time of reflective display utilizing external light. Further, by the agency of the second retardation film 18, the third retardation film 19, the second polarizing film 17, and the backlight 16 that are installed on the underside of the liquid crystal element 22, display in excellent contrast can be effected by lighting up the backlight 16 even in an environment where external light is insufficient. That is, this embodiment can provide a transflective liquid crystal display device employing a single polarizing film method, effecting display of high quality.

Furthermore, with adoption of the transflective reflector 14 provided with the opening 14a corresponding to the respective pixels, a liquid crystal display device with emphasis placed on transmissive display can be fabricated by enlarging the respective openings 14a, and a liquid crystal display device with emphasis placed on reflective display can be fabricated by diminishing the size of the respective openings 14a.

Variations of Third Embodiment

With the third embodiment described above, polycarbonate is used for the second retardation film 18, and polypropylene is used for the third retardation film 19, however, as long as there is a difference in wavelength dependency of refractive index between both the retardation films, an advantageous effect to a degree can be obtained. Excellent contrast was obtained even in the case where polyallylate was used for the second retardation film 18, and polyvinylalcohol was used for the third retardation film 19.

Further, with the third embodiment described above, the retardation value F2 of the second retardation film 18 is set to 0.36 μm while the retardation value F3 of the third retardation film 19 is set to 0.50 μm, however, as long as a relationship of ΔF=F3−F2=0.14 μm is maintained, a similar advantageous effect can be obtained even if the retardation values F2, F3 are different from those described above.

Figure 11:
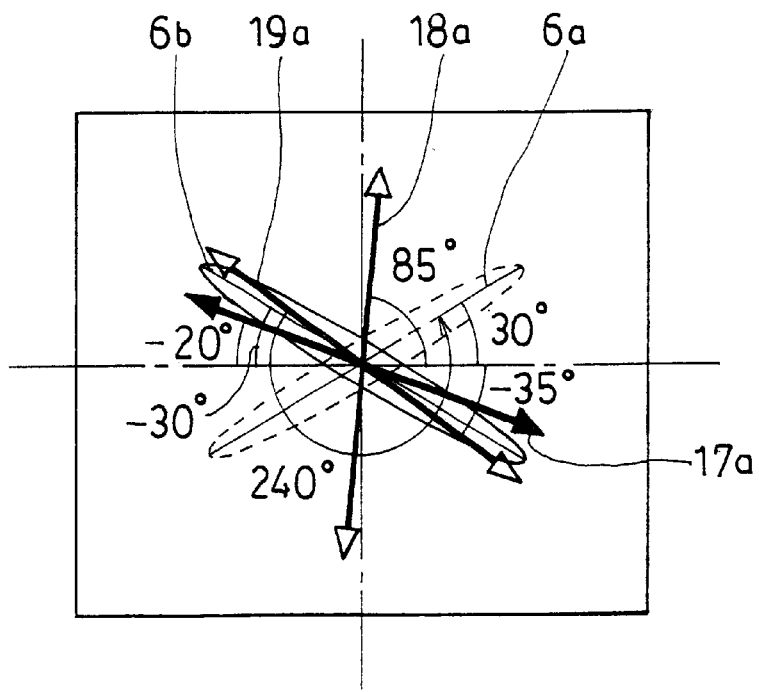
FIG. 11 is a view illustrating a relationship among a twist angle of a liquid crystal element, a phase delay axis of a second retardation film, a third retardation film, and a second polarizing film, respectively, with reference to a fourth embodiment of a liquid crystal display device according to the invention.

Fourth Embodiment: FIGS. 8, 9, and 11

Subsequently, a fourth embodiment of a liquid crystal display device according to the invention is described hereinafter.

The liquid crystal display device according to the fourth embodiment differs from the liquid crystal display device according to the third embodiment described above only in respect of a type and an placement angle of a second retardation film 18 and a third retardation film 19, respectively.

Accordingly, the basic constitution of the liquid crystal display device is the same as that of the third embodiment as shown in FIGS. 8 and 9, so that description thereof is omitted.

The second retardation film 18 is a transparent film about 70 μm thick, formed by drawing polycarbonate (PC), and has a retardation value F2=0.14 μm, equivalent to a quarter-wavelength, for light rays at a wavelength of 0.55 μm. The third retardation film 19 also is a transparent film about 70 μm thick, formed by drawing polycarbonate (PC), and has a retardation value F3=0.28 μm, equivalent to a half-wavelength, for light rays at a wavelength of 0.55 μm.

A configuration of constituent members of the liquid crystal display device according to the fourth embodiment is described hereinafter with reference to FIG. 11.

Since a configuration of a lower molecular alignment direction 12a of a twisted retardation film 12 deposited on the upper side of a liquid crystal element 22 relative to an upper molecular alignment direction 12b thereof, and a configuration of a phase delay axis 13a of a first retardation film 13 relative to a transmission axis 11a of a first polarizing film 11 are the same as those for the first embodiment shown in FIG. 4, description thereof is omitted.

As shown in FIG. 11, the second retardation film 18 is disposed on the underside of the liquid crystal element 22 such that a phase delay axis 18a thereof is oriented at +85° on the basis of the horizontal axis, and the third retardation film 19 is disposed such that a phase delay axis 19a thereof is oriented at −35° on the basis of the horizontal axis. Accordingly, the phase delay axis 18a of the second retardation film 18 intersects the phase delay axis 19a of the third retardation film 19 at 60°.

Also, the second polarizing film 17 is disposed such that a transmission axis 17a thereof is oriented at −20° on the basis of the horizontal axis, thereby crossing a transmission axis 11a (refer to FIG. 4) of a first polarizing film 11 at right angles.

Further, a lower liquid crystal molecule alignment direction 6a as well as an upper liquid crystal molecule alignment direction 6b of the liquid crystal element 22 as shown in FIG. 11, and a twist angle formed thereby are the same as those for the first embodiment shown in FIG. 3.

Now, the operation and effect of the liquid crystal display device according to this embodiment is described hereinafter.

Reflective display with this embodiment is the same as that for the third embodiment, and display in excellent contrast can be effected by the agency of the twisted retardation film 12 and the first retardation film 13.

Accordingly, transmissive display effected when a backlight 16 is lit up is described hereinafter. With the third embodiment, two sheets of retardation films having different wavelength dependencies of refractive index, respectively, are employed, however, even if a constituent material having an identical wavelength dependency of refractive index is used for the two retardation films, it is possible to obtain the wide-band quarter-wavelength film capable of converting light in the entire visible light region into circularly polarized light.

With the fourth embodiment, by superposing the second retardation film 18 having the retardation value F2=0.14 μm, equivalent to a quarter wavelength, on the third retardation film 19 having the retardation value F3=0.28 μm, equivalent to a half wavelength, such that the phase delay axis 18a intersects the phase delay axis 19a at 60°, the sum of the retardation values of the two retardation films becomes 0.14 μm for a light ray at a wavelength of 0.55 μm, and becomes smaller than 0.14 μm for light rays at shorter wavelengths in the vicinity of 0.4 μm, becoming greater than 0.14 μm for light rays at longer wavelengths in the vicinity of 0.7 μm.

Further, a real composite phase delay axis of the two retardation films will be positioned halfway between the phase delay axis 18a of the second retardation film 18 and the phase delay axis 19a of the third retardation film 19, and will be oriented at −65° on the basis of the horizontal axis.

That is, even with two retardation films made of a constituent material having an identical wavelength dependency of refractive index, it becomes possible to set up the so-called wide-band quarter-wavelength film wherein retardation values thereof for light rays at shorter wavelengths are smaller than those for light rays at longer wavelengths.

That is, the quotient F/λ, a retardation value F divided by a wavelength λ, can be rendered approximately one quarter over all wavelengths, so that circular polarized light can be obtained over all wavelengths in the visible light region.

Light emitted by the backlight 16 and sent out therefrom is turned into linearly polarized light polarized in the direction of the transmission axis 17a of the second polarizing film 17 upon passing therethrough. Since the linearly polarized light falls at an angle of 45° relative to a real composite phase delay axis of the two retardation films, namely, the second retardation film 18 and the third retardation film 19, the linearly polarized light is turned into circularly polarized light.

Upon falling of the circularly polarized light on the liquid crystal element 22, about 70% of the circularly polarized light is reflected by the transflective reflector 14, but remaining about 30% thereof is transmitted therethrough.

In a state where no voltage is applied to the liquid crystal element 22, birefringent tendency is equivalent to a quarter wavelength for light rays over substantially all wavelengths by the agency of the twisted retardation film 12, the liquid crystal element 22, and the first retardation film 13.

Consequently, retardation occurring to the second retardation film 18 and the third retardation film 19 is subtracted by retardation occurring to the liquid crystal element 22, the twisted retardation film 12, and the first retardation film 13, thus the difference between becomes zero, whereupon, the circularly polarized light is turned into linearly polarized light polarized in the direction identical to that of the transmission axis 17a of the second polarizing film 17 before outgoing.

However, as the transmission axis 11a of the first polarizing film 11 crosses the transmission axis 17a of the second polarizing film 17 at right angles, the light falling on the second polarizing film 17 is not transmitted through the first polarizing film 11, and is not sent out to the visible side, thereby effecting black display. Further, with this embodiment, better black display can be effected due to use of the second retardation film 18 and the third retardation film 19.

When a voltage is applied between first electrodes 3 and second electrodes 4, liquid crystal molecules of nematic liquid crystal 6 are caused to rise, and a real Δnd value of the liquid crystal element 22 decreases.

Consequently, the linearly polarized light incoming from the backlight 16 through the second polarizing film 17 is turned into circularly polarized light upon passing through the second retardation film 18 and the third retardation film 19, but is turned into elliptically polarized light or linearly polarized light as a result of transmitting through the twisted retardation film 12 and the liquid crystal element 22.

When a retardation value occurring in the liquid crystal element 22 is rendered equivalent to a quarter wavelength by applying the voltage thereto, the linearly polarized light incoming through the second polarizing film 17 has the direction of polarization, rotated by 90° after further passing through the twisted retardation film 12 and the first retardation film 13, and consequently, is transmitted through the first polarizing film 11, before being sent out to the visible side. As a result, excellent white display can be effected.

Thus, by the agency of the first polarizing film 11, the first retardation film 13, the twisted retardation film 12, and the liquid crystal element 22 incorporating the transfiective reflector 14, excellent black display and bright white display can be effected at the time of reflective display utilizing external light. Further, by the agency of the second retardation film 18, the third retardation film 19, the second polarizing film 17, and the backlight 16 that are installed on the underside of the liquid crystal element 22, display in excellent contrast can be effected by lighting up the backlight 16 even in an environment where external light is insufficient. That is, this embodiment can provide a transflective liquid crystal display device employing a single polarizing film method, effecting display of high quality.

Variations of Fourth Embodiment

With the fourth embodiment described above, the second retardation film 18 is disposed such that the phase delay axis 18a thereof is oriented at +85° on the basis of the horizontal axis, and the third retardation film 19 is disposed such that the phase delay axis 19a thereof is oriented at −35° on the basis of the horizontal axis, however, even if the second retardation film 18 is disposed such that the phase delay axis 18a thereof is oriented at −35°, and the third retardation film 19 is disposed such that the phase delay axis 19a thereof is oriented at +85°, a similar advantageous effect can be obtained as long as an intersection angle formed by the phase delay axis 18a and the phase delay axis 19a is 60°.

Figure 12:
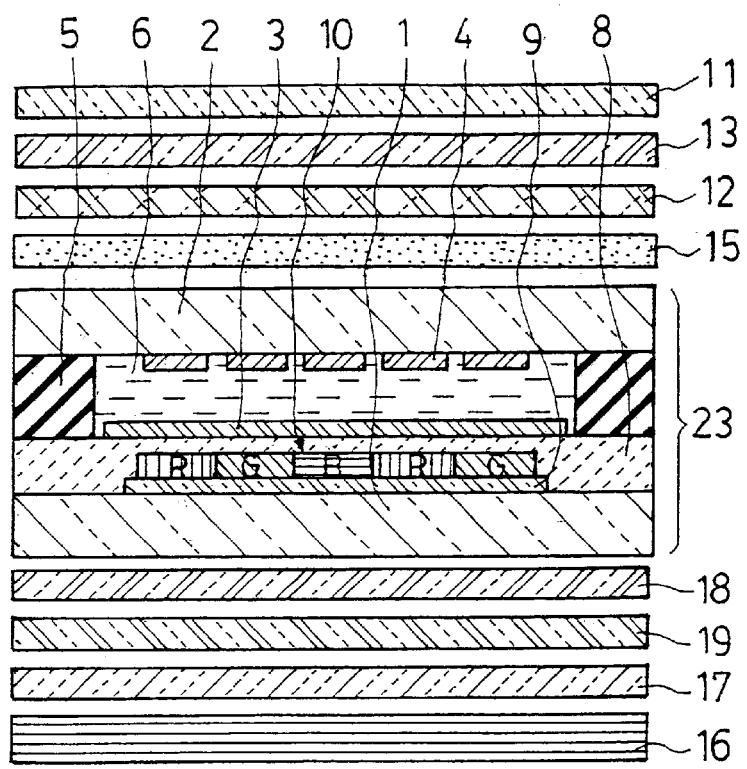
FIG. 12 is a schematic sectional view showing the constitution of a fifth embodiment of a liquid crystal display device according to the invention.
Figure 13:
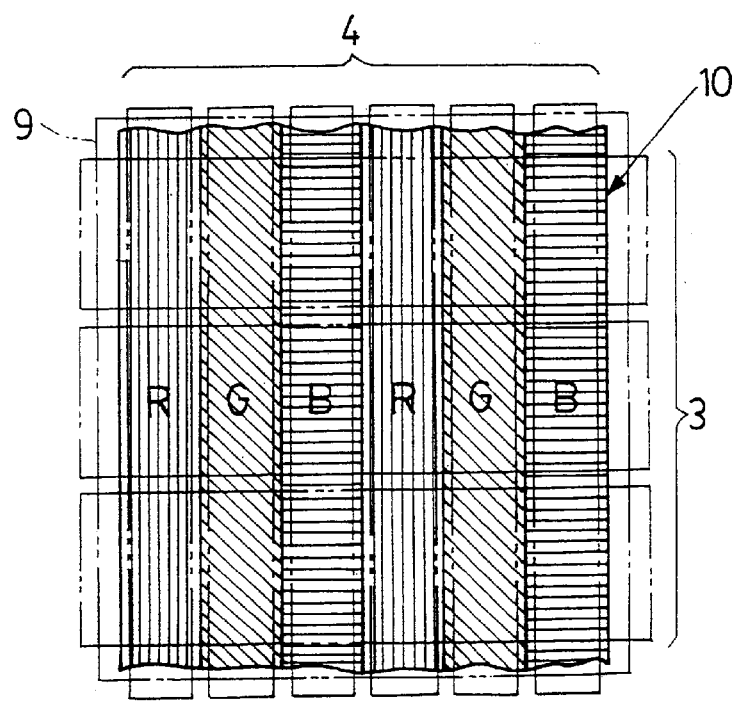
FIG. 13 is a plan view showing a planar configuration among a color filter, a transflective reflector, first electrodes, and second electrodes of the liquid crystal display device.

Fifth Embodiment: FIGS. 12 and 13

Next, a fifth embodiment of a liquid crystal display device according to the invention is described hereinafter with reference to FIGS. 12 and 13.

The liquid crystal display device according to the fifth embodiment differs in constitution from the previously-described liquid crystal display device according to the fourth embodiment only in that a shape of a transflective reflector incorporated in a liquid crystal element is different, and a color filter is installed, enabling color display to be effected.

FIGS. 12 and 13 are a schematic sectional view illustrating the constitution of the liquid crystal display device according to the fifth embodiment, and a schematic plan view of the color filter and so forth, respectively, corresponding to FIGS. 8 and 9 for the fourth embodiment, respectively, and in FIGS. 12 and 13, parts corresponding to those in FIG. 11 are denoted by the like reference numerals. Accordingly, description of the same parts as those in FIGS. 8 and 9 is omitted.

Similarly to the liquid crystal element 21 for the second embodiment as shown in FIGS. 5 and 6, with a liquid crystal element 23 of this liquid crystal display device, a half-mirror made up of an aluminum film 0.02 $\mu$m thick, serving as a transflective reflector 9, is formed on the inner face of a first substrate 1 thereof.

Further, on top of the transflective reflector 9, there is formed a color filter 10, 1 $\mu$m thick, composed of filters in three colors, consisting of red filters R, green filters G, and blue filters B, and the color filter 10 is coated with a protective film 8, 2 $\mu$m thick, made of an acrylic material.

The constitution of the liquid crystal display device, in other respects, is the same as that for the liquid crystal display device according to the fourth embodiment.

With this embodiment, since a thickness of the aluminum film as the transflective reflector 9 is set to 0.02 $\mu$m as with the case of the second embodiment, about 10% to 20% of incident light is transmitted therethrough while remaining 80% to 90% thereof is reflected.

As shown in FIG. 13, the transfiective reflector 9 and the color filter 10 are formed in a square shape or a rectangular shape, large enough to cover a display region in whole, including all of respective pixels where first electrodes 3 and second electrodes 4 cross and superpose each other, respectively.

The respective red filters R, green filters G, and blue filters B, making up the color filter 10, are formed in stripes in such a way as to be parallel with, and to superpose the respective second electrodes 4 patterned in columnar stripes, and disposed in the order of R, G, and B.

The respective color filter R, G, B are formed to have a width wider than that of the respective second electrodes 4 so as not to have gaps within the color filter. It is not desirable to have the gaps formed within the color filter 10 because this will cause display colors to be mixed with white light, thereby degrading color purity, although a quantity of incident light is increased, and images in display become brighter.

For a backlight 16, the same electroluminesecnt (EL) element emitting white light as used in the first to the fourth embodiments may be used, however, in carrying out this embodiment, a backlight of sidelight type, that is, a three-wavelength type fluorescent tube attached to a light guide plate is used from the standpoint of enhancement of chroma and brightness.

For improvement of brightness, the color filter 10 preferably has the maximum transmittance as high as possible at an optical spectrum, and the respective color filters R, G, B preferably have the maximum transmittance of not lower than 80%, most preferably not lower than 90%. Further, the color filter 10 needs to have the minimum transmittance as high as in a range of from 20% to 50%.

For the color filter 10, various types such as a pigment dispersion type, a dyeing type, a printing type, a transfer type, a electrodeposition type and so forth can be used, however, a color filter of the pigment dispersion type, made by dispersing a pigment in an acrylic resin based or PVA based photosensitive resin, is most preferable because of heat resistance at high temperatures and excellent color purity.

For obtaining the color filter 10 having such a high transmittance as described above, the transflective reflector 9 composed of a thin aluminum film is formed on the inner face of the first substrate 1, the surface of the transflective reflector 9 is inactivated by anodizing, subsequently a color effected even at the time of reflective display when the backlight 16 is not lit up.

Next, transmissive display effected when the backlight 16 is lit up is described hereinafter. Since the transflective reflector 9 and the color filter 10 have no birefringent tendency, operation at the time of transmissive display is the same as that for the fourth embodiment. Accordingly, the light emitted from the backlight 16 is turned into linearly polarized light polarized in the direction of the transmission axis 17a of a second polarizing film 17 passing therethrough, and the linearly polarized light is further turned into circularly polarized light as a result of transmitting through a third retardation film 19 and a second retardation film 18.

Then, about 80% of the circularly polarized light falling on the liquid crystal element 23 is reflected by the transflective reflector 9, but remaining 20% thereof is transmitted therethrough.

In a state where no voltage is applied to the liquid crystal element 23, birefringent tendency is equivalent to a quarter wavelength for light rays substantially over all wavelengths by the agency of the twisted retardation film 12, the liquid crystal element 23, and a first retardation film 13. Accordingly, retardation occurring to the second retardation film 18 and the third retardation film 19 is subtracted by retardation occurring to the liquid crystal element 23, the twisted retardation film 12, and the first retardation film 13, thus the difference between becomes zero, whereupon, the circularly polarized light is turned into linearly polarized light polarized in the direction identical to that of the transmission axis 17a of the second polarizing film 17 before outgoing.

However, since the transmission axis 11a of a first polarizing film resist with 10% to 15% of a pigment blended with photosensitive resin is applied to the inner face of the first substrate 1 by use of a spinner, and an exposure and a development treatment is applied thereto, thereby enabling the color filter 10 having a high transmittance even with a thickness thereof at 1 μm to be formed.

The constitution of the liquid crystal display device, in other respects, is the same as that for the liquid crystal display device according to the fourth embodiment. A planar configuration among respective constituent members of the liquid crystal display device also is the same as that for the fourth embodiment shown in FIG. 10.

Subsequently, the effect and operation of the liquid crystal display device according to the fifth embodiment is described hereinafter.

Since the color filter 10 has no birefringent tendency at all, the operation at the time of reflective display is the same as that for the fourth embodiment, and display in excellent contrast can be effected by use of a twisted retardation film 12, and a first retardation film 13.

By combining a pixel in the on (white) state with a pixel in the off black state, color display can be effected. For example, red display can be effected by turning a pixel provided with a red filter R "on" (white) while turning both a pixel provided with a green filter G and a pixel provided with a blue filter B "off" (black). Further, yellow display can be effected by turning both a pixel provided with a red filter R, and a pixel provided with a green filter G "on" (white) while turning a pixel provided with a blue filter B "off" (black).

With the transflective liquid crystal display device according to this embodiment, a high reflectance and a contrast ratio value as high as not less than 10 are obtained, so that bright color display having high chroma is 11 crosses the transmission axis 17a of the second polarizing film 17 at right angles, the linearly polarized light falling on the first polarizing film 11 is not transmitted therethrough, and is not sent out to the visible side, thereby effecting black display. When a voltage is applied between first electrodes 3 and second electrodes 4, white display is effected due to the same operation as that for the fourth embodiment.

In the case of the operation for transmissive display as well, color display can be effected by combining the "on" state of a pixel display with the "off" state thereof as with the case of the operation for reflective display.

Thus, by the agency of the first polarizing film 11, the first retardation film 13, the twisted retardation film 12, a diffusion film 15, and the liquid crystal element 23 incorporating the transflective reflector 9 and the color filter 10, color display in excellent contrast can be effected at the time of reflective display using external light. Further, by the agency of the second retardation film 18, the third retardation film 19, the second polarizing film 17, and the backlight 16 that are deposited on the underside of the liquid crystal element 23, excellent color display can be effected by lighting up the backlight 16 even in an environment where external light is insufficient.

That is, this embodiment can provide a transflective color liquid crystal display device employing a single polarizing film method, effecting color display of high quality.

Variations of Fifth Embodiment

With the fifth embodiment described above, the color filter 10 is installed on the side of the first substrate 1, however, the color filter 10 may be formed on the inner side of the second substrate 2, and between the second electrodes 4 and the second substrate 2.

However, the color filter 10 is preferably installed on the side of the first substrate 1 because a protective film 8 can then serve for planarization of the color filter 10, doubling as an insulation film between the transflective reflector 9 and the first electrodes 3.

Further, with the embodiment described above, for the color filter 10, the filters in three colors consisting of red, green, and blue, respectively, are used, however, even with the use of filters in three colors consisting of cyan, yellow, and magenta, respectively, similar bright color display can be effected.

Also, with the embodiment described above, in forming the transflective reflector 9, the surface of a thin aluminum film is inactivated by anodizing so as to be able to withstand a cleaning operation in the fabrication process of the color filters, however, a transparent oxide film such as a silicon oxide ($SiO_2$) film, and so forth may be formed on the thin aluminum film instead by use of the sputtering method or the chemical vapor deposition (CVD) method.

Figure 14:
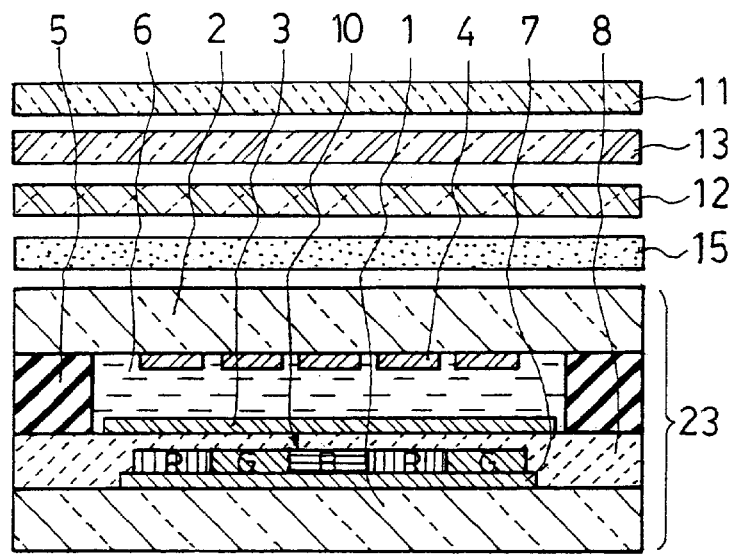
FIG. 14 is a schematic sectional view showing the constitution of a sixth embodiment of a liquid crystal display device according to the invention.
Figure 15:
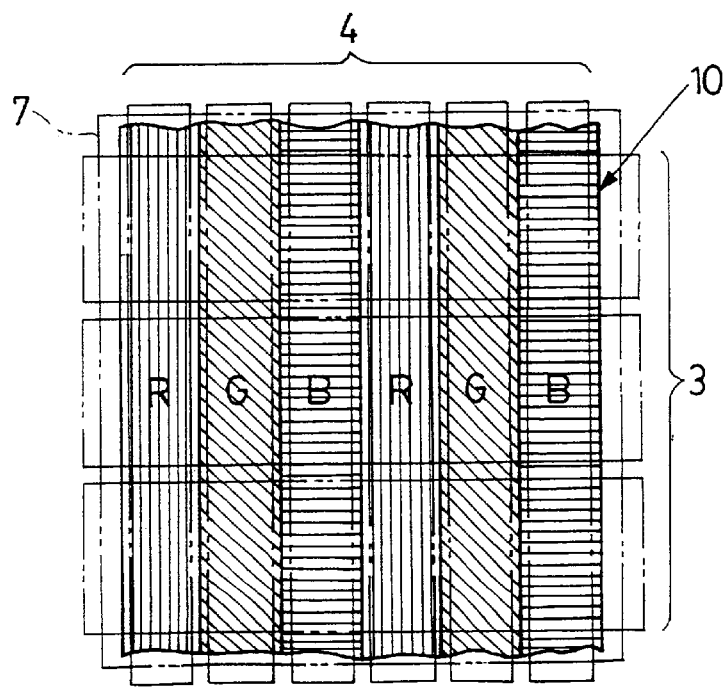
FIG. 15 is a plan view showing a planar configuration among a color filter, a reflector, first electrodes, and second electrodes of the liquid crystal display device.

Sixth Embodiment: FIGS. 14 and 15

Next, a sixth embodiment of a liquid crystal display device according to the invention is described hereinafter.

FIGS. 14 and 15 are a schematic sectional view illustrating a constitution of the liquid crystal display device, and a schematic plan view of a color filter, and so forth thereof, respectively, corresponding to FIGS. 12 and 13 for the fifth embodiment, respectively, and in FIGS. 14 and 15, parts corresponding to those in FIGS. 12 and 13 are denoted by the like reference numerals. Accordingly, description thereof is omitted.

According to the constitution of the liquid crystal display device of the sixth embodiment, a reflector 7 made up of a aluminum film 0.1 μm thick is formed on the inner face of a first substrate 1 of a liquid crystal element 24 as with the case of the reflector 7 of the first embodiment shown in FIGS. 1 and 2 in place of the transflective reflector 9 incorporated inside the liquid crystal element 23 for the fifth embodiment as described with reference to FIGS. 12 and 13. This embodiment differs in constitution from the fifth embodiment in that there is installed no constituent member on the underside (a side opposite from the visible side) of the liquid crystal element 24.

Further, a color filter 10 installed inside the liquid crystal element 24 is the same in constitution as the color filter 10 for the fifth embodiment. However, the color filter 10 for this embodiment is formed on the reflector 7 in place of the transflective reflector 9 disposed on the first substrate 1.

With the liquid crystal display device according to this embodiment, color display in high contrast as bright as or brighter than that for the liquid crystal display device according to the fifth embodiment can be effected at the time of reflective display using external light. However, it is not possible to effect transmissive display by lighting up a backlight.

With the liquid crystal display device according to this embodiment as well, variations thereof similar to those of the first embodiment and the fifth embodiment can be provided.

INDUSTRIAL APPLICABILITY

As described in the foregoing, with the single polarizing film type liquid crystal display device according to the invention, reflective display which is bright and in high contrast can be effected by taking advantage of external light while with the transflective liquid crystal display device according to the invention, not only reflective display similar to the above but also transmissive display which is in high contrast can be effected by lighting up the backlight. Further, with either of the liquid crystal display devices described above, variation thereof is made available so as to enable color display to be effected as well.

Accordingly, these liquid crystal display devices are available for widespread application as a display unit for various electronic equipment such as cellular phones, personal digital assistants (PDA), portable PCs, game players, timepieces, video cameras, and so on.

What is claimed is:

1. A liquid crystal display device comprising:
   a liquid crystal element comprised of a twist aligned nematic liquid crystal layer sandwiched between a first substrate thereof, provided with a reflector and first electrodes, and a second substrate thereof, provided with second electrodes;
   a twisted retardation film deposited on the outer side of the second substrate of the liquid crystal element;
   a retardation film deposited on the outer side of the twisted retardation film; and
   a polarizing film deposited on the outer side of the retardation film,
   wherein a twist direction of the twisted retardation film is opposite to a twist direction of the liquid crystal element, a twist angle of the twisted retardation film is smaller than a twist angle of the liquid crystal element by a range of 10° to 20°, and a Δnd value of the twisted retardation indicating birefringent tendency thereof is smaller than a Δnd value of the liquid crystal element, indicating birefringent tendency thereof by a range of 0.2 μm to 0.3 μm.

2. A liquid crystal display device according to claim 1, wherein filters in plurality of colors are provided on either of the first substrate and the second substrate of the liquid crystal element.

3. A liquid crystal display device according to claim 1, wherein a diffusion film is deposited on the outer side of the second substrate of the liquid crystal element.

4. A liquid crystal display device comprising:
   a liquid crystal element comprised of a twist aligned nematic liquid crystal layer sandwiched between a first substrate thereof, provided with a transflective reflector and first electrodes, and a second substrate thereof, provided with second electrodes;
   a twisted retardation film deposited on the outer side of the second substrate of the liquid crystal element;
   a first retardation film deposited on the outer side of the twisted retardation film;
   a first polarizing film deposited on the outer side of the first retardation film;
   a second retardation film deposited on the outer side of the first substrate of the liquid crystal element;
   a second polarizing film deposited on the outer side of the second retardation film; and
   a backlight disposed on the outer side of the second polarizing film,
   wherein a retardation value of the second retardation film is substantially equal to one quarter wavelength.

5. A liquid crystal display device claim 4, wherein a twist direction of the twisted retardation film is opposite to a twist direction of the liquid crystal element, a twist angle of the twisted retardation film is smaller than a twist angle of the liquid crystal element by a range of 10° to 20°, and a Δnd value of the twisted retardation film, indicating birefringent tendency thereof is smaller than a Δnd value of the liquid crystal element, indicating birefringent tendency thereof by a range of 0.2 μm to 0.3 μm.

6. A liquid crystal display device according to claim 4, wherein the transflective reflector is a thin metal film with a thickness in a range of 0.03 μm to 0.01 μm.

7. A liquid crystal display device according to claim 4, wherein the transflective reflector is a thin metal film provided with an opening defined at every spot corresponding to respective pixels.

8. A liquid crystal display device according to claim 4, wherein filters in plurality of colors are provided on either of the first substrate and the second substrate of the liquid crystal element.

9. A liquid crystal display device according to claim 4, wherein a diffusion film is deposited on the outer side of the second substrate of the liquid crystal element.

10. A liquid crystal display device comprising:

a liquid crystal element comprised of a twist aligned nematic liquid crystal layer sandwiched between a first substrate thereof, provided with a transflective reflector and first electrodes, and a second substrate thereof, provided with second electrodes;

a twisted retardation film deposited on the outer side of the second substrate of the liquid crystal element;

a first retardation film deposited on the outer side of the twisted retardation film;

a first polarizing film deposited on the outer side of the first retardation film;

a second retardation film deposited on the outer side of the first substrate of the liquid crystal element;

a third retardation film deposited on the outer side of the second retardation film;

a second polarizing film deposited on the outer side of the third retardation film; and a backlight disposed on the outer side of the second polarizing film;

wherein a first phase delay axis of the second retardation film crosses a second phase delay axis of the third retardation film substantially at right angles;

wavelength dependency of a retardation value of the second retardation film differs from wavelength dependency of a retardation value of the third retardation film; and the difference between the retardation value of the second retardation film and the retardation value of the third retardation film is substantially equal to one quarter wavelength.

11. A liquid crystal display device according to claim 10, wherein a twist direction of the twisted retardation film is opposite to a twist direction of the liquid crystal element, a twist angle of the twisted retardation film is smaller than a twist angle of the liquid crystal element by a range of 10° to 20°, and a Δnd value of the twisted retardation film, indicating birefringent tendency thereof is smaller than a Δnd value of the liquid crystal element, indicating birefringent tendency thereof by a range of 0.2 μm to 0.3 μm.

12. A liquid crystal display device according to claim 10, wherein filters in plurality of colors are provided on either of the first substrate and the second substrate of the liquid crystal element.

13. A liquid crystal display device according to claim 10, wherein a diffusion film is deposited on the outer side of the second substrate of the liquid crystal element.

14. A liquid crystal display device according to claim 10, wherein the transflective reflector is a thin metal film with a thickness in a range of 0.03 μm to 0.01 μm.

15. A liquid crystal display device according to claim 10, wherein the trasflective reflector is a thin metal film provided with an opening defined at every spot corresponding to respective pixels.

16. A liquid crystal display device comprising:

a liquid crystal element comprised of a twist aligned nematic liquid crystal layer sandwiched between a first substrate thereof, provided with a transflective reflector and first electrodes, and a second substrate thereof, provided with second electrodes;

a twisted retardation film deposited on the outer side of the second substrate of the liquid crystal element;

a first retardation film deposited on the outer side of the twisted retardation film;

a first polarizing film deposited on the outer side of the first retardation film;

a second retardation film deposited on the outer side of the first substrate of the liquid crystal element;

a third retardation film deposited on the outer side of the second retardation film;

a second polarizing film deposited on the outer side of the third retardation film; and a backlight disposed on the outer side of the second polarizing film;

wherein the phase delay axis of the second retardation film intersects the phase delay axis of the third retardation film substantially at 60 degrees; and a retardation value of the second retardation film is substantially equal to one quarter wavelength and a retardation value of the third retardation film is substantially equal to half wavelength.

17. A liquid crystal display device according to claim 16, wherein a twist direction of the twisted retardation film is opposite to a twist direction of the liquid crystal element, a twist angle of the twisted retardation film is smaller than a twist angle of the liquid crystal element by a range of 10° to 20°, and a Δnd value of the twisted retardation film, indicating birefringent tendency thereof is smaller than a Δnd value of the liquid crystal element, indicating birefringent tendency thereof by a range of 0.2 μm to 0.3 μm.

18. A liquid crystal display device according to claim 4, wherein filters in plurality of colors are provided on either of the first substrate and the second substrate of the liquid crystal element.

19. A liquid crystal display device according to claim 16, wherein a diffusion film is deposited on the outer side of the second substrate of the liquid crystal element.

20. A liquid crystal display device according to claim 16, wherein the transflective reflector is a thin metal film with a thickness in a range of 0.03 μm to 0.01 μm.

21. A liquid crystal display device according to claim 16, wherein the transflective reflector is a thin metal film provided with an opening defined at every spot corresponding to respective pixels.

* * * * *

UNITED STATES PATENT AND TRADEMARK OFFICE
CERTIFICATE OF CORRECTION

PATENT NO.    : 6,693,692 B1
DATED         : February 17, 2004
INVENTOR(S)   : Yasushi Kaneko et al.

It is certified that error appears in the above-identified patent and that said Letters Patent is hereby corrected as shown below:

Column 24,
Line 50, delete "claim 4" and insert -- according to claim 4 --.

Column 26,
Line 25, delete "the phase" and insert -- a first phase --.
Line 26, delete "the phase" and insert -- a second phase --.
Line 41, delete "claim 4" and insert -- claim 16 --.

Signed and Sealed this

Thirteenth Day of July, 2004

JON W. DUDAS
*Acting Director of the United States Patent and Trademark Office*